(12) United States Patent
Reisinger (10) Patent No.: US 6,469,620 B2
(45) Date of Patent: Oct. 22, 2002

(54) METHOD AND APPARATUS FOR PROTECTING A TRANSMISSION PATH BETWEEN A BASE UNIT AND A MOBILE KEY UNIT

(75) Inventor: Thomas Reisinger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/897,419

(22) Filed: Jul. 3, 2001

(65) Prior Publication Data

US 2002/0027500 A1 Mar. 7, 2002

(30) Foreign Application Priority Data

Jul. 4, 2000 (DE) .......................................... 100 32 422

(51) Int. Cl.⁷ .............................................. B60R 25/10
(52) U.S. Cl. ................. 340/426; 340/425.5; 340/825.7; 340/825.72; 340/5.3; 340/5.64; 340/5.72; 455/67.1; 455/67.6; 455/303; 455/304; 455/315; 375/141; 375/145; 375/371; 375/373; 375/375
(58) Field of Search ............................... 340/426, 425.5, 340/825.7, 825.72, 5.3, 5.61, 5.64, 5.72; 455/67.1, 67.6, 303, 304, 315; 375/141, 145, 371, 373, 375

(56) References Cited

U.S. PATENT DOCUMENTS

| | | | | |
|---|---|---|---|---|
| 3,707,651 A | * | 12/1972 | Lensner et al. | 317/28 R |
| 4,388,730 A | * | 6/1983 | Nash et al. | 455/208 |
| 4,511,919 A | * | 4/1985 | Forgey et al. | 358/120 |
| 4,538,281 A | * | 8/1985 | Rajan | 375/2.2 |
| 4,691,326 A | * | 9/1987 | Tsuchiya | 375/1 |
| 5,511,236 A | * | 4/1996 | Umstattd et al. | 455/76 |

* cited by examiner

Primary Examiner—Jeffery Hofsass
Assistant Examiner—Tai T. Nguyen
(74) Attorney, Agent, or Firm—Morrison & Foerster LLP (57) ABSTRACT

The invention relates to a method and apparatus for protecting a transmission path between a base unit and a mobile key unit in an access control system, in particular for motor vehicles. A carrier signal which is modulated with a user signal is transmitted from a transmitting unit to a receiving unit. According to the invention, a separate reference signal, which has a fixed phase angle with respect to the carrier signal, is also transmitted. The phases of the reference signal and of the carrier signal are compared in a test circuit, and an alarm signal is emitted if a phase difference which varies with time is found.

22 Claims, 3 Drawing Sheets

METHOD AND APPARATUS FOR PROTECTING A TRANSMISSION PATH BETWEEN A BASE UNIT AND A MOBILE KEY UNIT

CLAIM FOR PRIORITY

This application claims priority to Application No. 10032422.3 which was published in the German language on Jul. 4, 2000.

TECHNICAL FIELD OF THE INVENTION

The invention relates to a method for protecting a transmission path between a base unit and a mobile key unit in an access control system, and in particular for motor vehicles, in which a carrier signal which is modulated with a user signal is transmitted from a transmitting unit to a receiving unit, and to an access authorization control system.

BACKGROUND OF THE INVENTION

Access authorization control systems are often used for motor vehicle locking systems. They provide a high degree of security and ensure access only to authorized users, while at the same time allowing a high degree of convenience. The latter is of major importance for acceptance of the systems.

Conventionally, such an access authorization control system includes a base unit, which is arranged in a motor vehicle for example, and one or more mobile key units, which are carried by the authorized vehicle users, for example.

Active access control systems have also been known for a relatively long time, in which the user himself carries out some action. The action may be, for example, operation of a pushbutton to initiate the access authorization control process and—if the result is positive—is granted access. Passive access authorization control systems have been developed in order to improve additional user convenience, and can identify that the user is approaching the area to be protected, for example a motor vehicle. Hence, the system can automatically initiate an access authorization control process. In this case, it is for preferable that the checking of access authorization has been completed when the user reaches the protected area to enter, for example when he reaches his vehicle and wishes to open the vehicle door. To this end, the access authorization control system is designed such that the base unit continuously attempts to communicate with, for example, a key unit. When a key unit is identified, the signals are interchanged, and the key unit is authenticated. If the authentication is positive, access is then allowed, for example with the doors of the vehicle being unlocked, an alarm system being deactivated and an immobilizer being disabled. In an ideal situation, the access authorization control system operates so as to be transparent to the user. That is, the user only becomes aware of the result—namely access to the vehicle. For example, the user is not aware of the system activity, particularly of the data interchange between the base unit and the key unit. However, this convenience, specifically the capability of the entire authentication process to take place without the user being aware of it, carries a certain risk. Unauthorized intervention in the transmission path could occur, and could even possibly be successful, without the authorized user being aware of this.

In order to prevent this, it is necessary to protect the transmission path. The transmission path is generally in the form of a radio path, between the base unit and the key unit. Unauthorized intervention in the transmission path and hence in the communication between the base unit and the key unit should be identified and should be protected against.

SUMMARY OF THE INVENTION

In one embodiment of the invention, there is a method for protecting a transmission path between a base unit and a mobile key unit in an access control system. The method includes, for example, modulating a carrier signal with a user signal, transmitting the carrier signal from a transmitting unit to a receiving unit, and transmitting a reference signal, which is at a constant phase angle with respect to the carrier signal, comparing the phases of the reference signal and the carrier signal and emitting an alarm signal if a phase difference which varies with time is detected.

In one aspect of the invention, the reference signal is modulated onto the carrier signal.

In another aspect of the invention, the reference signal is added to the carrier signal at one or more predetermined positions in time.

In another aspect of the invention, the user signal and the reference signal are transmitted in parallel.

In another aspect of the invention, the reference signal is modulated onto the carrier signal by means of I/Q modulation.

In another aspect of the invention, the reference signal is modulated onto the carrier signal by a spread-spectrum method.

In another aspect of the invention, the reference signal is produced from a chip clock for the transmitting unit.

In another aspect of the invention, the clock signal and the reference signal are produced from a common source.

In another aspect of the invention, the receiver carries out demodulation with carrier recovery.

In another aspect of the invention, in order to compare the phases, the phase difference is formed and is checked for its constancy.

In another aspect of the invention, the reference signal is determined during an observation time which can be predetermined.

In another aspect of the invention, the observation time is varied as a function of a security level.

In another embodiment of the invention there is an access authorization control system. The system includes, for example, a base unit and a mobile key unit, each of which has a transmitter and a receiver to transmit a carrier signal, wherein the transmitter in the base unit has a carrier signal source and a reference signal generator for producing and transmitting a reference signal whose phase is locked to the carrier signal, and the receiver has a phase detector and a test circuit, the test circuit configured for evaluating the phase angle between the carrier signal and the reference signal.

In one aspect of the invention, the reference signal generator is a frequency divider and is connected to the carrier signal.

In another aspect of the invention, the transmitter has a modulation unit which modulates the reference signal onto the carrier signal at predetermined times.

In another aspect of the invention, the modulation unit has a plurality of channels to modulate the reference signal and a user signal onto the carrier signal.

In another aspect of the invention, the modulation unit is an in-phase/quadrature modulator, where the user signal is modulated on one channel, and the reference signal is modulated onto another channel.

In another aspect of the invention, the modulation unit is a spread-spectrum modulator.

In another aspect of the invention, the reference signal is supplied to the clock input of a PN sequence generator.

In another aspect of the invention, the receiver has a separate demodulator for the reference signal.

In another aspect of the invention, the transmitter and the reference signal generator, and the receiver and the phase detector, are arranged in the same unit.

In another aspect of the invention, a switching device is provided for the observation time.

BRIEF DESCRIPTION OF THE DRAWINGS

The invention will be explained in more detail in the following text using exemplary embodiments and with reference to the drawing, in which.

DETAILED DESCRIPTION OF THE PREFERRED EMBODIMENTS

One embodiment of the invention discloses a method and apparatus whereby the risk of unidentified intervention in a transmission path between the base unit and the key unit can be reduced.

In another embodiment of the invention, there is a method for protecting a transmission path between a base unit and a mobile key unit in an access control system, in particular for motor vehicles, in which a carrier signal which is modulated with a user signal is transmitted from a transmitting unit to a receiving unit, to ensure protection against unauthorized intervention in that a separate reference signal is also transmitted which has a fixed phase with respect to the carrier signal, the phases of the reference signal and of the carrier signal are compared with one another, and an alarm signal is emitted if the phase difference varies with time. The invention provides a method by which manipulations can be identified by the phase angle between the carrier signal and the reference signal varies within a specific observation time period.

In still another embodiment of the invention, signals are manipulated and the original signal is varied. That is, the manipulation of the transmission path by an unauthorized user causes changes to the signals, in particular to the carrier signal.

It is virtually impossible for an unauthorized user to produce a manipulated signal whose phase and frequency are exactly correct. At a minimum, phase errors occur—with respect to a reference. The invention provides for phase errors caused by manipulation to be traced by comparing the phase of the carrier signal with the phase of a reference signal. This comparison enables a higher level of security by identifying phase errors in the manipulated signals.

Although it may be difficult to fully prevent an attacker (i.e. unauthorized user) from producing a manipulated carrier signal at exactly the correct frequency, the probability that the corrupted (i.e. manipulated) carrier signal will have the correct phase angle with respect to the reference signal is extremely low. Hence, the invention provides a very reliable identification of, and hence protection against, unauthorized intervention in the transmission path.

In yet another embodiment, there is a method to prevent an unauthorized user of producing a carrier signal with the correct phase, even with the knowledge of phase angle of the carrier. An unathutorized user attempting to forge the phase angle would first have to know how the correct phase angle between the reference signal and the carrier signal is produced. In order to determine this, at least coherent demodulation of the original carrier signal is necessary. This can be carried out, technically, only with great complexity and, bearing in mind that the transmitted pulses are generally only short, leads to relatively inaccurate results since the signal duration which can be evaluated is only short. Hence, a carrier signal produced in this way will not have the required phase angle, so that intervention can be identified even in this case.

In another embodiment of the invention, intervention is further exacerbated if the distances between the base unit and the key unit are relatively long. At a long range, the phase becomes location-dependent in a significant manner, which leads to additional uncertainties with regard to the phase angle of a corrupted carrier signal that is to be produced.

The reference signal may be any desired signal which is suitable for transmission from one unit to another. However, the signal is preferably modulated onto the carrier signal. This minimizes the additional circuitry and complexity since the reference signal does not require its own radio-frequency unit, but uses the carrier signal unit, which is already present.

The reference signal can be transmitted alternately with, or at the same time as (in parallel with) the data signal. Alternate transmission minimizes additional circuitry, since an existing modulation unit for the user signal can then also be used for modulation of the reference signal. Parallel transmission requires somewhat greater circuit complexity, but results in advantages in terms of security and speed. Simultaneous transmission reduces transmissions in which there is no user signal being used to introduce a separate transmitter for the (corrupted) reference signal into the path. Additionally, the method becomes faster, since the transmission and testing of the reference signal take place at the same time as the user signal transmission. No additional time is therefore required for transmitting the reference signal.

Additional security is achieved by transmitting the reference signal by adding it at one or more predetermined positions in time to the carrier signal, rather than by transmitting it continuously. This further exacerbates unauthorized intervention since the attacker cannot measure the reference signal all the time but only at certain times. In the event of intervention, it may be added only at specific times, without any exception. If the evaluation circuit is aware of the predetermined number of times at which a reference signal is added, then unauthorized intervention can be identified from the reference signal occurring at an incorrect time. Furthermore, this reduces the energy required to transmit the reference signal, which is particularly advantageous in the case of units supplied from rechargeable batteries. This discontinuous additional process may be used both for simultaneous and for alternate transmission of the reference signal together with the user signal.

In one particularly advantageous development of the method, the user signal and data signal are modulated onto the carrier signal by means of in-phase/quadrature modulation (I/Q modulation). This allows parallel transmission with only a small amount of additional circuitry. I/Q modulation also has the advantage that it is difficult for an attacker to identify it, and it can be demodulated correctly only with a considerable amount of hardware complexity and specialist knowledge.

Another embodiment of the invention provides a spread-spectrum method as the modulation method. In this case, the method results in the advantage that it is difficult for an attacker to identify it and it is also very resistant to interference. Furthermore, it allows parallel transmission of the user and reference signals with virtually no additional complexity. On the other hand, manipulation of spread-spectrum signals is more difficult since this requires increased hardware complexity and demands a greater level of knowledge. In the case of parallel transmission, it is beneficial to produce the reference signal from a clock signal in the transmitting unit. This may be the chip clock, which is present in any case, and is derived from a crystal. This clock signal can advantageously be used to produce a PN sequence for spread-spectrum modulation. This makes it even more difficult for an attacker to access the reference signal because the PN sequence being used must be known in order to obtain the reference signal from the spread-spectrum signals. In order to minimize the circuitry, it is helpful for the clock signal and the reference signal to be produced from a common source.

During demodulation, it is beneficial for the receiver to use a demodulation process in which the carrier signal is recovered. Demodulation methods that are suitable for this purpose are well known. The recovered carrier signal allows the phase angle between the carrier signal and reference signal to be checked accurately and with a high level of immunity from interference. However, checking is not necessarily required for the carrier to be recovered. For example, in situations in which the receiver which carries out the demodulation is arranged in the same unit as that in which the carrier signal was originally produced, the carrier signal is already available. The phases are advantageously compared by forming the phase difference between the carrier signal and the reference signal, and checking this for it being constant. This has the advantage that the process does not depend on the absolute phase angle or phase difference between the reference signal and carrier signal, but in fact on the phase angle being constant and not varying. This results in advantages both in terms of implementation complexity and in terms of security. A method which is not dependent on the absolute phase angle but checks for constancy of the phase difference can be produced with little complexity. If an attacker manipulates the transmission path, the attacker can no longer produce the carrier signal at exactly the correct phase and frequency. The phase difference between the carrier and reference signals is thus no longer constant, but varies with time. The phase difference is can be detected over an observation time, for this purpose. The duration of the observation time can be determined in advance. This governs the accuracy with which errors in the phase angle and hence manipulation on the transmission path can be identified. The longer the observation time, the greater the accuracy. The observation time is advantageously chosen such that the phase difference during the observation time varies by $\pi$, preferably by $2\pi$.

The observation time is preferably not predetermined in a fixed manner, but can be varied as required. This allows the security method to be flexibly matched to changing environments with a different threat potential. Defining the duration of the observation time is typcailly a compromise between security and convenience. This is because longer observation times increase the time required for authentication of the key unit and lead to the system reacting more slowly. Varying the observation time allows adaptation depending on the "risk level" of an environment, with user convenience remaining ensured as far as possible. This results in security levels. The adaptation process can be carried out manually by the user, for example, when parking for lengthy periods in an unmonitored car park, or may be done automatically.

The invention, for the above purpose, monitors and evaluates the number of identified manipulation attempts to be detected and to be evaluated statistically, and preferably to be stored in a specific memory. The invention advantageously provides for the security level to be varied adaptively. It can be increased or decreased depending on the number of interventions that have occurred in a specific time period. In this way, a good compromise between security and convenience will be found automatically even if the threat is changing.

The access authorization control system according to the present invention implements the method and includes a base unit and a mobile key unit, each of which has a transmitter and a receiver for transmitting a carrier signal, with the transmitter in one of the two units having a carrier signal source and a reference signal generator for producing and transmitting a reference signal at a predetermined phase with respect to the carrier signal, and the receiver having a phase detector and a test circuit, which test circuit is designed for evaluating the phase angle between the carrier signal and the reference signal. This system is preferably for use in motor vehicles.

The invention preferably provides for the reference signal generator to be in the form of a frequency divider, to whose input the carrier signal source is applied. This has the advantage that the carrier signal and the reference signal can be derived from the same source, thus allowing the circuit complexity for producing the reference signal to be reduced.

The transmitter preferably has a modulation unit which is designed for modulating the reference signal onto the carrier signal at predetermined times. Furthermore, it can be designed such that the reference signal is modulated onto the carrier signal following the user signal.

It is advantageous to design the modulation unit to have a number of channels, in order to modulate the reference signal and the user signal onto the carrier signal in parallel. This allows the reference signal to be transmitted even while the user signal is being transmitted, so that no additional time penalty is incurred for transmitting the reference signal.

The modulation unit is preferably in the form of an in-phase/quadrature modulator, onto one of whose carriers the user signal is modulated, and onto whose other carrier the reference signal is modulated. This allows parallel, two-channel transmission of the user and reference signals to be achieved with little circuit complexity.

It also possible to provide for the modulation unit to be in the form of a spread-spectrum modulator. This makes it possible to provide multi-channel transmission with particularly little additional complexity. Furthermore, a spread-spectrum modulator allows transmission which can be measured and manipulated with difficulty, and is thus particularly secure. A PN (pseudo-noise) sequence generator is provided for producing the reference signal. This allows the circuit complexity additionally required for producing the reference signal to be minimized.

A switching device for the observation time is also provided. This has the advantage that it provides an instrument using which the observation time can be varied and, in particular, can be matched to the respective threat situation resulting from the danger level of the respective environment.

The receiver may have a separate demodulator for the reference signal. This is particularly beneficial where the demodulator for the user signal is not suitable for demodulation of the reference signal as well. This situation occurs in particular if the reference signal is to be demodulated at a different intermediate-frequency bandwidth to that of the user signal.

Figure 1:
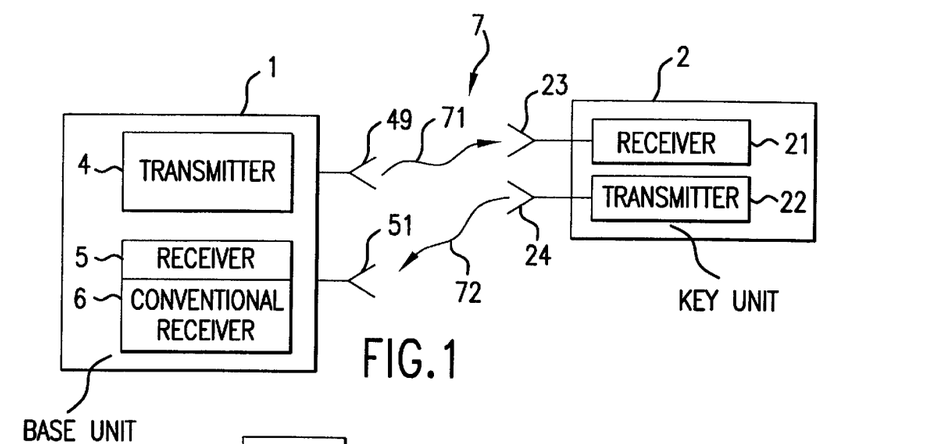
FIG. 1 shows a schematic overview of an access authorization control system.

FIG. 1 shows a schematic overview of an access authorization system comprising a base unit 1 and at least one key unit 2. The base unit 1 is arranged, for example, in a motor vehicle. It is connected to a power supply, which is not illustrated, for example to the vehicle battery. The key unit 2 is carried by an (authorized) user of the motor vehicle. For this purpose, it is designed to be physically compact and is provided with a small autonomous power supply.

The base unit 1 has a transmitter 4 and a receiver 5, which are connected respectively to a transmitting antenna 49 and to a receiving antenna 51. The antennas do not necessarily need to be separate, but can also be integrated. Accordingly, the key unit 2 has a receiving antenna 23 and a transmitting antenna 24, which are connected respectively to a receiver 21 and to a transmitter 22 in the key unit. The antennas 23, 24, 49 and 51 as illustrated are exemplary and are designed in particular to be integrated in the key unit.

The transmission path 7 extends between the base station 1 and the key unit 2, and its forward path and return path, respectively, are symbolized by respective arrows 71 and 72.

Figure 2:
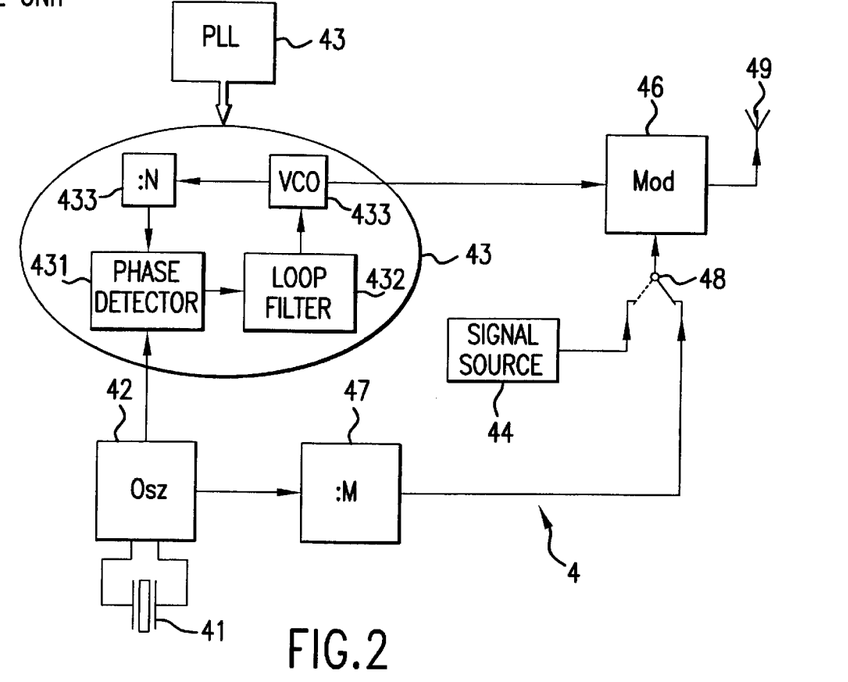
FIG. 2 shows a first embodiment of a transmitter according to the invention.

The transmitter 4 in the base unit is illustrated in more detail in FIG. 2. As the carrier signal source, the transmitter 4 has a crystal oscillator 42 with a crystal 41, which is designed to produce an oscillator signal at a constant frequency. The oscillator signal is given by the following expression, where f is the crystal frequency:

$$S_{CRYSTAL} = \cos(2\pi f\, t)$$

The output of the oscillator is connected to one input of a phase locked loop (PLL) 43. This is designed for frequency multiplication. The PLL circuit 43 for this purpose has a phase detector 431, a loop filter 432, a voltage-dependent oscillator (VCO) 433 and a frequency divider (:N) 434. At its output, it produces a carrier signal $$S_{CARRIER} = \cos(2\pi N f\, t + \phi_1)$$

In this case, $\phi_1$ is a constant phase shift. The carrier signal is applied to a first input of a modulator 46. The transmitting antenna 49 is connected to one output of the modulator. An output of a changeover switch 48 is connected to a second input of the modulator, and this output is connected to a first input in the position illustrated by a dashed line in FIG. 2. A user signal source 44 is connected to the first input of the changeover switch. When the changeover switch is in this position, the user signal is modulated onto the carrier signal, and is emitted via the antenna 49. The modulator 46 is designed to carry out modulation such that carrier recovery is made possible, for example, PLL for amplitude modulation (AM), Costas loop or squaring loop for phase shift keying (PSK). Digital modulation techniques may also be used.

The production and modulation of the reference signal according to the invention onto the carrier are described in the following text. The input of a frequency divider (:M) 47 is connected to the crystal oscillator 42, whose signal is used for producing the carrier signal. The reference signal $$S_{REF} = \cos(2\pi 1/M f\, t + \phi_2)$$

is produced at the output of the frequency divider, where $\phi_2$ is a constant phase shift. A second input of the changeover switch 48 is connected to the output of the frequency divider 47. If the changeover switch 48 is switched to the position represented by the solid line following transmission of a user signal, the reference signal is applied to the modulator 46, and is modulated onto the carrier signal.

Thus, finally, the transmission signal 71 for amplitude modulation becomes:

$$S_{TRANS} = \tfrac{1}{2} m \cos[2\pi f(N-1/M)t + \phi_3] + \tfrac{1}{2} m \cos[2\pi f N\, t + \phi_4] + \tfrac{1}{2} m \cos[2\pi f(N+1/M)t + \phi_3]$$

where $\phi_3$, $\phi_4$ are constant phase shifts, and m is the modulation level.

Figure 3:
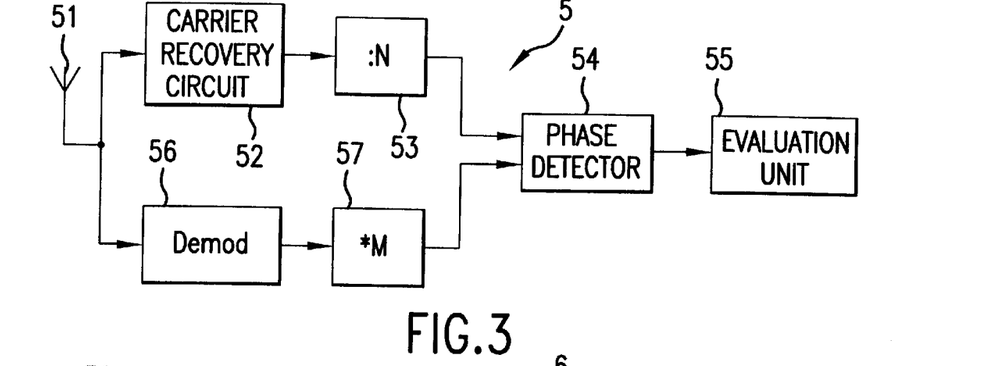
FIG. 3 shows a first embodiment of a receiver according to the invention.

The receiver 5 is shown in more detail in FIG. 3. The transmission signal 71 emitted from the transmitter 4 is received by the receiving antenna 51. This is connected, firstly, to one input of a carrier recovery circuit 52 which, at its output, produces the recovered carrier signal $$S_{R,CARRIER} = \cos(2\pi N f\, t + \phi_6)$$

which is applied to the input of a frequency divider (:N) 53. A divided, recovered carrier signal $s_{R,CARRIER\ N}$ is emitted at the output of the frequency divider 53 and is applied to a first input of a phase detector 54.

Secondly, the receiving antenna 51 is connected to one input of a reference demodulator (Demod) 56. The recovered, demodulated reference signal $$S_{R,REF} = \cos(2\pi 1/M f\, t + \phi_5)$$

is emitted at its output, and is applied to one input of a multiplier (*M) 57, whose output, together with its multiplied recovered reference signal $s_{R,REF\ M}$, is applied to a second input of the phase detector 54.

The signals $$S_{R,CARRIER\ N} = \cos(2\pi f\, t + \phi_7)$$

$$S_{R,REF\ M} = \cos(2\pi f\, t + \phi_8)$$

are thus applied to the inputs of the phase detector.

The receiver 5 thus not only recovers the carrier signal but also demodulates the reference signal. Provided they are original signals from the transmitter 4, these two signals must have a constant phase angle between them, which is governed by $\phi_1$ and $\phi_2$ at the transmitter end. If the signals do not have this specific phase angle between them, then the signals have been manipulated, that is to say unauthorized intervention in the transmission path 7 has taken place. In order to check the phase, the frequencies of the carrier signal and of the reference signal must first be matched. For this purpose, the carrier signal is divided by N by means of the frequency divider 53, and the reference signal is multiplied by the factor M by means of the multiplier 57. The signals $s_{R,CARRIER\ N}$ and $s_{R,REF\ M}$ produced in this way are both at the oscillator frequency. The phase angle between them can now be checked.

For this purpose, the receiver 5 has the phase detector 54 and an evaluation unit 55. If necessary, an averaging unit (not illustrated) can also be provided, in order to compensate for phase jitter.

The phase detector 54 emits a measurement signal, in particular a voltage signal, which is dependent on the magnitude of the phase difference $|\phi_7-\phi_8|$ between the recovered carrier signal and the reference signal. The measurement signal is checked for constancy by the evaluation unit 55. Although the absolute magnitude of the measurement signal (of the phase difference) may also be used for evaluation, this value has little value however, since, in practice, it cannot typically be controlled owing to the various tolerances in the system. This has the advantage that phase shifts, such as those which can result due to different signal propagation times for the carrier signal and reference signal, do not influence the evaluation. This allows simplified accuracy requirements for the overall system, which is a major advantage, particularly for large-scale production, as is normally the case in motor vehicle construction. This avoids complex compensation devices for temperature and aging effects. Additionally, the oscillator 42 together with the crystal 41 do not typcially change phase during a measurement time period. This can be satisfied easily and at low cost.

In the event of unauthorized intervention in the transmission path 7, information relating to the original carrier signal is lost. In the event of intervention, although a carrier signal could be produced, its frequency and phase would not match exactly, however. In the receiver 5, this would mean that $\phi_7$ was no longer constant. The phase difference $|\phi_7-\phi_8|$ is thus no longer constant either. The voltage at the output of the phase detector 54 (the measurement signal) varies with time. This is detected by the evaluation unit 55, and the manipulation is thus identified.

Manipulations of the carrier signal that are minute can also be detected in this way. However, in practice, in order to ensure that the access authorization control system responds within an acceptable time, the time during which the evaluation unit 55 monitors the phase angle (observation time) is limited. To be more precise, the length of the observation time governs the accuracy with which a false carrier signal can be identified. In one embodiment of the invention, the evaluation unit 55 is designed such that manipulation is detected when the measurement signal at the output of the phase detector 54 has assumed its minimum and maximum voltage at least once during the observation time. A phase shift of at least $\pi$, and preferably of $2\pi$, is required for this purpose, depending on the phase detector.

Figure 4:
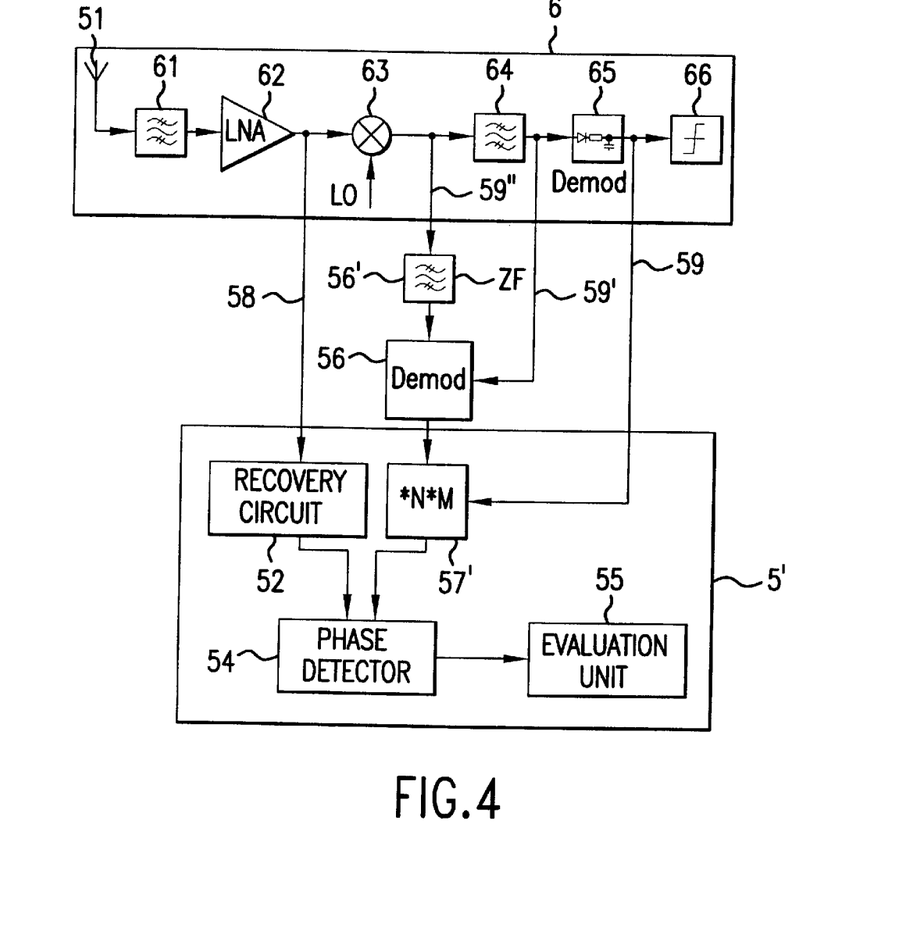
FIG. 4 shows a second embodiment of a transmitter.

In order to shorten the observation time while guaranteeing the accuracy, it is preferable for the signals applied to the phase detector 54 to be at as high a frequency as possible. Such a receiver 5' is illustrated in FIG. 4. This largely corresponds to the receiver 5 illustrated in FIG. 3, with identical elements being denoted by the same reference symbols. However, instead of the multiplier 57 which multiplies by the factor M, a multiplier 57' is provided, which multiplies by the factor N*M. The emitted signal, which is emitted to the phase detector 54, is then $$s_{R,REF\ N \cdot M}=\cos(2\pi Nf\ t+\phi_{8'})$$

This avoids the need for the frequency divider 53 in the path for the carrier signal, so that the recovered carrier signal $$s_{R,CARRIER}=\cos(2\pi Nf\ t+\phi_6)=\cos(2\pi Nf\ t+\phi_7)$$

is applied directly to the phase detector 54 (taking account of the fact that $\phi_7=\phi_6$).

In this case, the phase comparison is carried out at the carrier frequency, that is to say at a frequency which is higher by N than in the receiver 5 illustrated in FIG. 3. For example, in order to identify a manipulated carrier signal whose frequency differs from that of the original carrier signal by 10 Hz, the receiver 5' requires an observation time of 100 ms if the phase detector 54 and the evaluation unit 55 are designed to identify a phase shift of $2\pi$, or 50 ms if a phase shift of $\pi$ is sufficient for identification.

In the receiver 5, which is illustrated in FIG. 3, and in which the phase comparison takes place at a frequency which is lower by N, an observation time of about N*100 ms or N*50 ms is preferable to achieve the same accuracy.

FIG. 4 furthermore shows that a receiver 5' according to the invention can easily be introduced into an existing system, to be precise without additional complexity. The upper part of FIG. 4 shows a conventional receiver 6 of the ASK type. In addition to the receiving antenna 51, this comprises a surface acoustic wave filter (SAW) 61, a preamplifier 62, an IF mixer 63, an IF filter 64 and a demodulator 65 with a detector 66 connected to it. This conventional receiver 6 is connected to the receiver 5' according to the invention by first and second lines 58, 59. The output of the preamplifier 62 is connected to the input of the carrier recovery circuit 52 via the first line 58. In order to apply the reference signal, the output of the demodulator 65 is connected to the input of the multiplier 57' via the second line 59. The receiver 5 can thus be connected to a conventional receiver 6 using only two lines 58, 59. In addition, in this case, the receiver 5' may also use a number of elements from the conventional receiver 6, so that the additional complexity required for the receiver 5' is minimized.

FIG. 4 furthermore shows alternative types of connection for the receiver 5 to the conventional receiver 6. These differ in terms of the number of elements of the conventional receiver 6 which are still used, and in the number of additionally required elements. No further elements apart from the receiver 5' are required for connection using the second line 59. The demodulator 56 for the reference signal is also required for connection by the second line 59'. This type of connection is preferable when the demodulator 65 is not suitable for the reference signal. Apart from the demodulator 56, an additional IF filter 56' is required for connection by the second line 59". This type of connection is expedient in particular when the bandwidth of the IF filter 64 is not suitable for the reference signal.

The conventional receiver often already has a carrier recovery circuit. This applies in particular to receivers using coherent demodulation, for example PSK receivers. In this case, the receiver 5 according to the invention does not need to have its own carrier recovery circuit 52.

Figure 5:
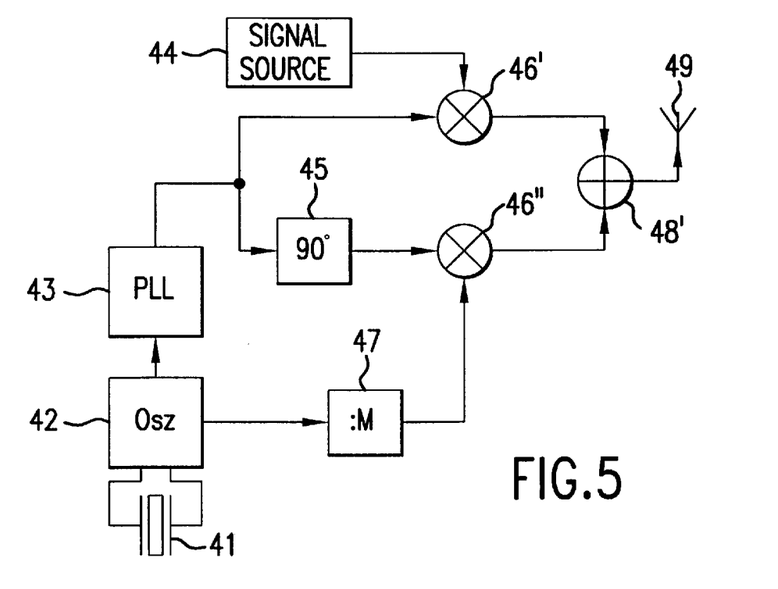
FIG. 5 shows a third embodiment of a transmitter.

FIG. 5 illustrates a second embodiment of the transmitter 4 from FIG. 2. Identical parts are provided with the same reference symbols. To the extent that they match those illustrated in FIG. 2, they will not be explained any further in the following text.

Instead of the modulator 46 together with the changeover switch 48, the transmitter has an I/Q modulator. This comprises a phase shifter 45, two modulators 46', 46" and an adder 48'. The output of the PLL circuit 43 is split into two branches. The upper branch is connected to one input of the modulator 46', to whose second input the data source is connected. The output of the modulator 46' is connected to a first input of the adder 48'. The lower branch is connected to one input of the phase shifter 45. The phase shifter 45 is designed to shift the phase through $\pi/2$ (90°). Its output is connected to one input of the modulator 46", to whose other input the reference signal emitted from the divider 47 is applied. The output of the modulator 46" is connected to a second input of the adder 48'. The output of the adder 48' is, finally, connected to the transmitting antenna 49. An I/Q modulator formed in such a way allows the user signal and the reference signal to be modulated onto the carrier in parallel, and thus to be transmitted at the same time. This is achieved by deriving a carrier signal (quadrature) phase-shifted through 90° from the actual carrier signal (in-phase). Mutually independent signals, namely the user signal and the reference signal, can be modulated onto the two carrier signals. For transmission, the two modulated carrier signals are joined together by the adder 48', so that, as before, one transmission channel is used.

At the receiver end, coherent demodulation is required in order to separate the in-phase carrier signal from the quadrature carrier signal. This means that the receiver has to recover the phase of the carrier signal. This does not result in any additional complexity in this case, since appropriate carrier recovery 52 must be carried out in any case for the phase comparison.

The parallel transmission of the user signal and reference signal has the advantage that this makes intervention in the transmission path more difficult to impossible. Furthermore, I/Q modulation has the further advantage that it makes it harder for the attacker to access the modulated signal, irrespective of whether this is the user signal or the reference signal, since—as already stated—coherent demodulation must be carried out for this purpose. This is considerably more difficult than conventional non-coherent demodulation.

Figure 6:
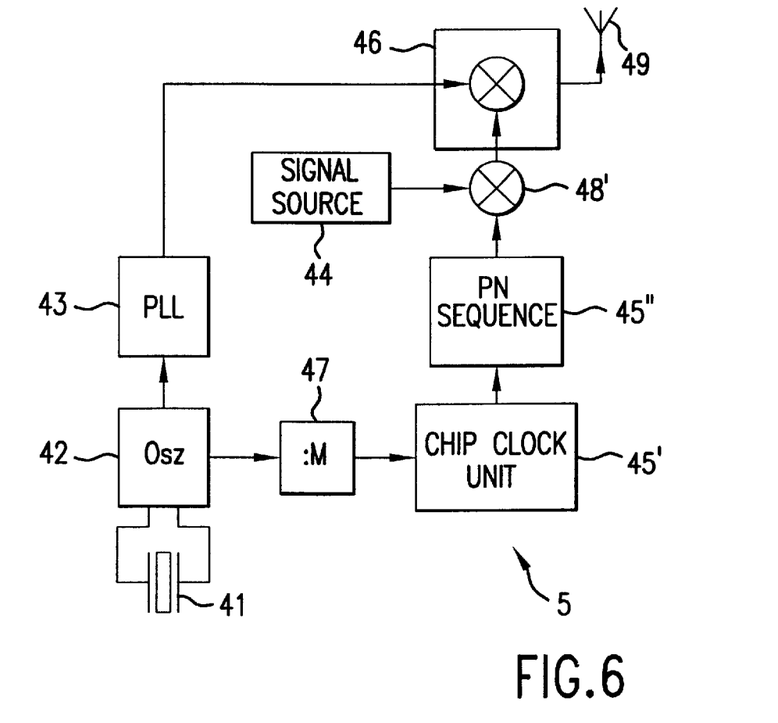
FIG. 6 shows the receiver and its link to a receiver in a conventional access authorization control system.

FIG. 6 illustrates a third embodiment of the transmitter 5 from FIG. 2. Identical parts are provided with the same reference symbols. To the extent that they match the items illustrated in FIG. 2, they will not be explained any further in the following text. As in the case of the second embodiment illustrated in FIG. 5, this embodiment allows parallel transmission of the user and reference signals. Furthermore, it makes manipulation even more difficult, since a spread-spectrum method is used for modulation.

Instead of the modulator 46 together with the changeover switch 48, this transmitter has a chip clock unit 45', a PN sequence generator 45", a modulator 48 and a modulation device 46'''. The output of the frequency divider 47 is connected to one input of the chip clock unit 45'. The output of the chip clock unit 45' is connected to one input of the PN sequence generator 45". The chip clock for producing the PN sequence is thus formed from the oscillator 42. In this case, the chip clock forms the reference signal. The chip clock is often in the region of several hundred kHz, and is thus intrinsically in a band which is suitable for use as a reference signal.

The chip clock should be recovered once again at the receiver end. This is accomplished by a correlation method; since this is typically used for recovery of the user signal when using spread-spectrum modulation, a circuit which is suitable for this purpose is already provided. The additional complexity required for the reference signal is thus minimal—with a high level of security against manipulation.

The spread-spectrum modulation offers further enhanced protection against manipulation, since an attacker must know the PN sequence being used in order to be able to extract the reference signal successfully.

The method and apparatus according to the invention are not restricted to one of the quoted modulation methods. Other modulation methods, in particular differential symbol coding (Differential BiPhase Shift Keying—DBPSK) can also be used. Likewise, other digital signal processing methods known to those skilled in the art can be used, in particular those for estimation of the carrier phase with coherent demodulation.

What is claimed is:

1. A method for protecting a transmission path between a base unit and a mobile key unit in an access control system, comprising:

modulating a carrier signal with a user signal;

transmitting the carrier signal from a transmitting unit to a receiving unit, and transmitting a reference signal, which is at a constant phase angle with respect to the carrier signal;

comparing the phases of the reference signal and the carrier signal; and emitting an alarm signal if a phase difference which varies with time is detected.

2. The method as claimed in claim 1, wherein the reference signal is modulated onto the carrier signal.

3. The method as claimed in claim 1, wherein the reference signal is added to the carrier signal at one or more predetermined positions in time.

4. The method as claimed in claim 1, wherein the user signal and the reference signal are transmitted in parallel.

5. The method as claimed in claim 4, wherein the reference signal is modulated onto the carrier signal by means of I/Q modulation.

6. The method as claimed in claim 1, wherein the reference signal is modulated onto the carrier signal by a spread-spectrum method.

7. The method as claimed in claim 1, wherein the reference signal is produced from a chip clock for the transmitting unit.

8. The method as claimed in claim 1, wherein the clock signal and the reference signal are produced from a common source.

9. The method as claimed claim 1, wherein the receiver carries out demodulation with carrier recovery.

10. The method as claimed in claim 1, wherein in order to compare the phases, the phase difference is formed and is checked for its constancy.

11. The method as claimed in claim 1, wherein the reference signal is determined during an observation time which can be predetermined.

12. The method as claimed in claim 1, wherein the observation time is varied as a function of a security level.

13. An access authorization control system, comprising:

a base unit and a mobile key unit, each of which has a transmitter and a receiver to transmit a carrier signal, wherein the transmitter in the base unit has a carrier signal source and a reference signal generator for producing and transmitting a reference signal whose phase is locked to the carrier signal, and the receiver has a phase detector and a test circuit, the test circuit configured for evaluating the phase angle between the carrier signal and the reference signal.

14. The access authorization control system as claimed in claim 13, wherein the reference signal generator is a frequency divider and is connected to the carrier signal.

15. The access authorization control system as claimed in claim 13, wherein the transmitter has a modulation unit which modulates the reference signal onto the carrier signal at predetermined times.

16. The access authorization control system as claimed in claim 13, wherein the modulation unit has a plurality of channels to modulate the reference signal and a user signal onto the carrier signal.

17. The access authorization control system as claimed in claim 16, wherein the modulation unit is an in-phase/quadrature modulator, where the user signal is modulated on one channel, and the reference signal is modulated onto another channel.

18. The access authorization control system as claimed in claim 13, wherein the modulation unit is a spread-spectrum modulator.

19. The access authorization control system as claimed in claim 18, wherein the reference signal is supplied to the clock input of a PN sequence generator.

20. The access authorization control system as claimed in claim 13, wherein the receiver has a separate demodulator for the reference signal.

21. The access authorization control system as claimed in claim 13, wherein the transmitter and the reference signal generator, and the receiver and the phase detector, are arranged in the same unit.

22. The access authorization control system as claimed in claim 13, further comprising a switching device is provided for the observation time.

* * * * *